(12) United States Patent
Xu et al.

(10) Patent No.: US 8,781,037 B2
(45) Date of Patent: Jul. 15, 2014

(54) METHOD AND A PROCESSING UNIT FOR PROCESSING A DATA SIGNAL

(75) Inventors: Zhe Xu, Xi'an (CN); Hong Zhang, Xi'an (CN); Zhen Wang, Xi'an (CN)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/534,146

(22) Filed: Jun. 27, 2012

(65) Prior Publication Data

US 2014/0003476 A1    Jan. 2, 2014

(51) Int. Cl.
H03D 1/00 (2006.01)
H04J 3/00 (2006.01)
H04W 4/00 (2009.01)

(52) U.S. Cl.
USPC .......... 375/343; 370/337; 455/422.1

(58) Field of Classification Search
USPC .......... 375/343; 370/337
See application file for complete search history.

(56) References Cited

U.S. PATENT DOCUMENTS

| | | | | |
|---|---|---|---|---|
| 4,645,884 A * | 2/1987 | Barazeche et al. | ....... | 379/406.01 |
| 5,303,226 A * | 4/1994 | Okanoue et al. | ....... | 370/442 |
| 5,838,672 A * | 11/1998 | Ranta | ....... | 370/335 |
| 6,345,183 B1 * | 2/2002 | Silventoinen et al. | ..... | 455/422.1 |
| 6,724,837 B1 * | 4/2004 | Zhou | ....... | 375/343 |
| 6,865,175 B1 * | 3/2005 | Ritter | ....... | 370/345 |
| 2002/0009065 A1 * | 1/2002 | Molko | ....... | 370/337 |
| 2004/0224636 A1 * | 11/2004 | Schmidl et al. | ....... | 455/63.1 |
| 2005/0271174 A1 * | 12/2005 | DiRenzo et al. | ....... | 375/354 |
| 2010/0040166 A1 | 2/2010 | Xin et al. | | |
| 2010/0203854 A1 * | 8/2010 | Yu et al. | ....... | 455/127.1 |
| 2010/0296597 A1 | 11/2010 | Lopez et al. | | |
| 2011/0255641 A1 * | 10/2011 | Lopez | ....... | 375/343 |

OTHER PUBLICATIONS

3GPP TS 45.001. 3rd Generation Partnership Project; Technical Specification Group GSM/EDGE Radio Access Network; Physical layer on the radio path; General description (Release 9). p. 37. May 2009.

3GPP TS 45.004 V8.0.0. 3rd Generation Partnership Project; Technical Specification Group GSM/EDGE Radio Access Network; Modulation (Release 8). p. 14. Dec. 2008.

* cited by examiner

*Primary Examiner* — Leon-Viet Nguyen
*Assistant Examiner* — Sarah Hassan
(74) *Attorney, Agent, or Firm* — Eschweiler & Associates, LLC

(57) ABSTRACT

The method includes receiving a data signal, the data signal including two training sequences, performing a first evaluation of the data signal based on a first training sequence of the two training sequences, performing a second evaluation of the data signal based on a second training sequence of the two training sequences, and processing the data signal based on a result of the first and second evaluations.

18 Claims, 4 Drawing Sheets

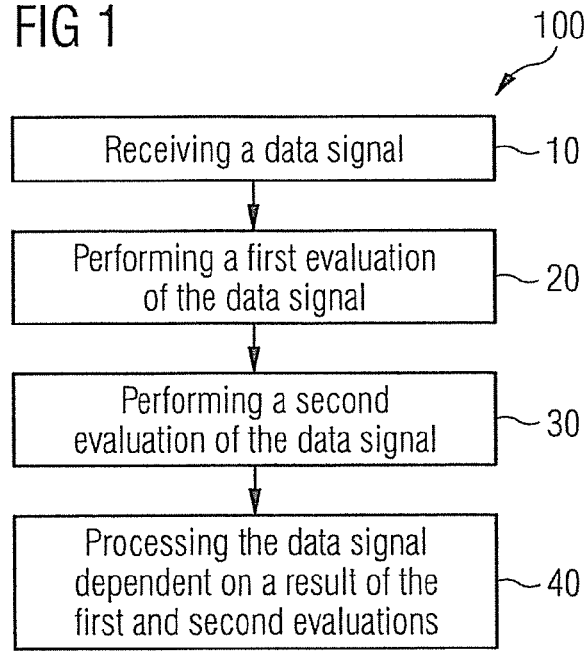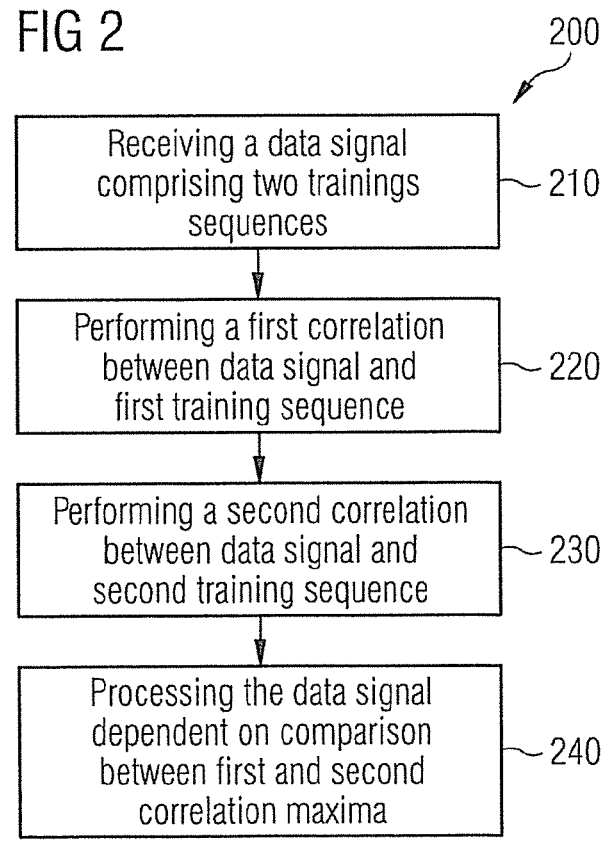

METHOD AND A PROCESSING UNIT FOR PROCESSING A DATA SIGNAL

FIELD

This invention relates to a method for processing a received data signal and a processing unit for processing a data signal.

BACKGROUND

Mobile communication systems employ signal processing techniques in order to improve the link performance and minimize inter-symbol interference caused by multi-path fading in frequency selective channels. Since the mobile radio channel is random and time-varying, an equalization is employed to determine the time-varying characteristics of the mobile channel adaptively through training and tracking. For that purpose a training sequence is included in the transmitted data signal, which is designed to allow the receiver to detect timing information and obtain channel coefficients through channel estimation for further channel equalization. With the increase in the number of subscribers and voice traffic, there is an increasing demand for efficient use of hardware and spectrum resources.

BRIEF DESCRIPTION OF THE DRAWINGS

FIG. 1 shows a flow diagram of a method for processing a received data signal according to the disclosure.

FIG. 2 shows a flow diagram of a method for processing a received data signal according to the disclosure.

DETAILED DESCRIPTION

Figure 3:
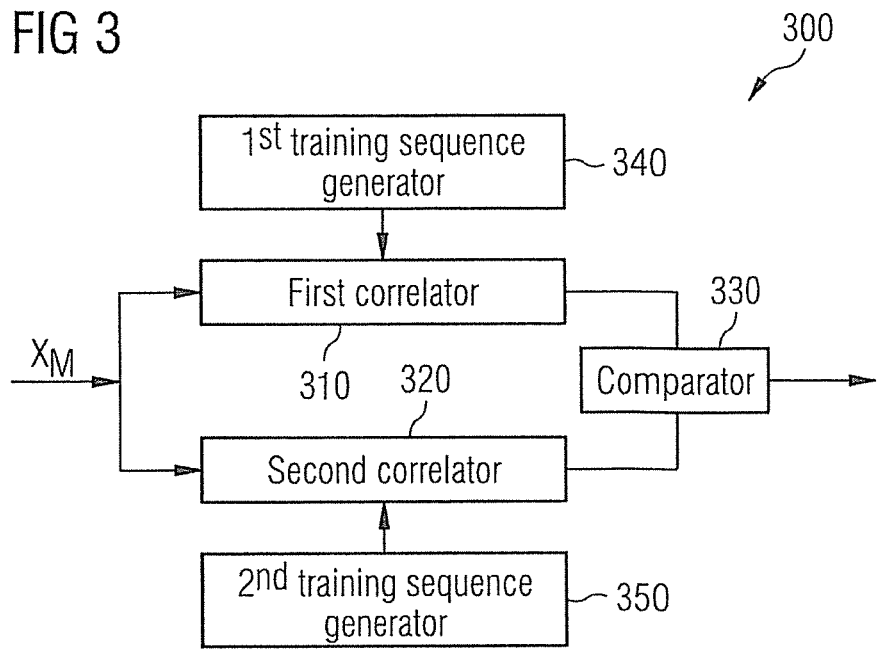
FIG. 3 shows a schematic block representation of a processing unit according to the disclosure.

The aspects and embodiments are described with reference to the drawings, wherein like reference numerals are generally utilized to refer to like elements throughout. In the following description, for purposes of explanation, numerous specific details are set forth in order to provide a thorough understanding of one or more aspects of the embodiments. It may be evident, however, to one skilled in the art that one or more aspects of the embodiments may be practiced with a lesser degree of the specific details. In other instances, known structures and elements are shown in schematic form in order to facilitate describing one or more aspects of the embodiments. It is to be understood that other embodiments may be utilized and structural or logical changes may be made without departing from the scope of the present invention.

In addition, while a particular feature or aspect of an embodiment may be disclosed with respect to only one of several implementations, such feature or aspect may be combined with one or more other features or aspects of the other implementations as may be desired and advantageous for any given or particular application. Furthermore, to the extent that the terms "include", "have", "with" or other variants thereof are used in either the detailed description or the claims, such terms are intended to be inclusive in a manner similar to the term "comprise". The terms "coupled" and "connected", along with derivatives may be used. It should be understood that these terms may be used to indicate that two elements co-operate or interact with each other regardless whether they are in direct physical or electrical contact, or they are not in direct contact with each other. Also, the term "exemplary" is merely meant as an example, rather than the best or optimal. The following detailed description, therefore, is not to be taken in a limiting sense, and the scope of the present invention is defined by the appended claims.

The methods and processing units as described herein are utilized as part of and for mobile communication systems, in particular Time Division Multiplex Access (TDMA) wireless systems such as, for example, the Global System for Mobile communications (GSM). More specifically, those systems are addressed herewith in which data are transmitted in fixed-length time slots, and a training sequence is included in time slots like normal bursts or synchronization bursts.

The methods and processing units as described herein are specifically utilized as part of and for mobile communication systems, in which voice capacity is increased by multiplexing more than one user on a single time slot. More specifically, those mobile communication systems are concerned herewith which are capable of Voice services over Adaptive Multi-user channels on One Slot (VAMOS). Hence, particular embodiments of the disclosure are directed to VAMOS capable methods, processing units, receivers and mobile phones.

The methods and processing units as described herein may be embodied in receivers like mobile phones, hand-held devices or other kinds of mobile radio transmitters. The described processing units may be employed to perform methods as disclosed herein, although those methods may be performed in any other ways as well.

The methods and processing units as described herein may also be utilized with any sort of antenna configurations employed within the mobile communication system. In particular, the concepts presented herein are applicable to mobile communication systems employing more than one transmit and/or receive antenna and in particular an arbitrary number of transmit and/or receive antenna.

In the claims and in the following description, different embodiments of a method for processing a received data signal are described as a particular sequence of processes or measures, in particular in the flow diagrams. It is to be noted that the embodiments should not be limited to the particular sequence described. Particular ones or all of different processes or measures can also be conducted simultaneously or in any other useful and appropriate sequence.

FIG. 1 shows a flow diagram of a method for processing a received data signal according to the disclosure. The method 100 of FIG. 1 comprises receiving a data signal, the data signal comprising two training sequences at 10, performing a first evaluation of the data signal based on a first training sequence of the two training sequences at 20, performing a second evaluation of the data signal based on a second training sequence of the two training sequences at 30, and processing the data signal based on a result of the first and second evaluations at 40.

The flow diagram of FIG. 1 comprises receiving a data signal at 10. The signal can be received by using a so-called Voice services over Adaptive Multi-user channels on a One Slot, VAMOS, receiver. Such a receiver can be adapted to take into account the known symmetries present in a symbol constellation when more than one user exists on the same channel. This is, for example, the case in adaptive symbol constellation such as an adaptive alpha-QPSK (Quaternary Phase Shift Keying) constellation. This quaternary constellation can be parameterized by a real-valued parameter which may be related to a power ratio of the real and imaginary parts of the baseband signal and may thus define the shape of the signal constellation. The real and imaginary parts of the baseband signal may be assigned to two users and may thus constitute two sub-channels. A particular set of training sequences may allow one to distinguish between the two VAMOS users representing a VAMOS pair. This particular set of training sequences can, for example, be found based on computational simulation work in order to obtain the best possible result with respect to cross-correlation properties between existing and new training sequences.

In the down-link direction the above-mentioned adaptive QPSK modulation scheme can be introduced instead of the GMSK modulation as used in normal operation of the GSM system. This enables one to schedule two users on in-phase (I) and quadrature-phase (Q). In addition, different power levels can be allocated to these sub-channels. The ratio of power between the I and Q channels is defined as the Sub-Channel Power Imbalance Ratio (SCPIR).

The two training sequences can be transmitted simultaneously within the data signal. They can be mapped on an alpha-QPSK signal, which can be transmitted during a training sequence period of a normal burst as standardized in the GSM system.

The flow diagram of FIG. 1 comprises performing a first evaluation of the data signal at 20. Performing the first evaluation may comprise performing a first correlation between the data signal and the first training sequence and determining a first correlation maximum thereof.

The flow diagram of FIG. 1 comprises performing a second evaluation of the data signal at 30. Performing the second evaluation may comprise performing a second correlation between the data signal and the second training sequence and determining a second correlation maximum thereof.

The method 100 may further comprise comparing the first correlation maximum with the second correlation maximum. Thereafter it may be determined which one is higher in value and the outcome thereof may determine a processing of the data signal at 40.

The flow diagram of FIG. 1 comprises processing the data signal at 40. Processing the data signal may comprise one or more of burst synchronization and channel estimation.

Burst synchronization is performed for time synchronization of the mobile with the time structure of the received data signal. The method 100 may comprise performing a first burst synchronization based on the first training sequence and at the same time performing a second burst synchronization based on the second training sequence, and utilizing the result of one of the first and second burst synchronizations or an average thereof dependent on a result of the first and second evaluations. If, for example, a result of the first and second evaluations is such that the first correlation maximum is higher than the second correlation maximum, it may be decided that only the result of the first burst synchronization shall be utilized for the further processing of the received data signal. On the other hand, if a result of the first and second evaluations is such that the second correlation maximum is higher than the first correlation maximum, it may be decided that only the result of the second burst synchronization is utilized for the further processing of the received data signal.

It may also be the case that a result of the first and second evaluations is such that the first correlation maximum and the second correlation maximum are equal or differ from each other by less than a predefined factor. In such a case it might then be determined to calculate an average of the first and second burst synchronizations and to utilize this average for the further processing of the data signal.

With respect to channel estimation, method 100 may comprise performing a first channel estimation based on the first training sequence and at the same time performing a second channel estimation based on the second training sequence, and utilizing the result of one of the first and second channel estimations or an average thereof based on a result of the first and second evaluations. If, for example, a result of the first and second evaluations is that such the first correlation maximum is greater than the second correlation maximum, then it may be decided that only the result of the first channel estimation is utilized for the further processing of the received data signal. On the other hand, if a result of the first and second evaluations is such that the second correlation maximum is greater than the first correlation maximum, then it may be decided that only the result of the second channel estimation is utilized for the further processing of the received data signal.

If a result of the first and second evaluations is such that the first and second correlation maxima are equal or differ from each other by less than a predefined factor, then it may be decided that an average of the results of the first and second channel estimations is utilized for the further processing of the received data signal. In this case, for example, average values of the channel coefficients determined in the first and second channel estimations may be calculated and utilized for equalizing the received data signal.

FIG. 2 shows a flow diagram of a method for processing a received data signal according to the disclosure. The method 200 of FIG. 2 comprises receiving a data signal, the data signal comprising two training sequences at 210, performing a first correlation between the data signal and a first training sequence of the two training sequences and determining a first correlation maximum thereof at 220, performing a second correlation between the data signal and a second training sequence of the two training sequences and determining a second correlation maximum thereof at 230, and processing the data signal based on a comparison between the first and second correlation maxima at 240.

The same embodiments as were described above in connection with the method of FIG. 1 and the steps thereof can also be applied to the method of FIG. 2.

FIG. 3 shows a schematic block representation of a processing unit according to the disclosure. The processing unit 300 of FIG. 3 comprises a first correlator 310 to perform a first correlation between a received data signal and a first training sequence and determine a first correlation maximum thereof. The processing unit 300 may further comprise a second correlator 320 to perform a second correlation between the received data signal and a second training sequence and determine a second correlation maximum thereof. The processing unit 300 may further comprise a comparator 330 to compare the first and second correlation maxima with each other and to output a respective information signal.

The first correlator 310 may comprise a first input for inputting therein the received data signal $X_n$ and a second input for inputting the first training sequence. The second input may be connected with a first training sequence register 340 for storing a set of first training sequences.

In a similar way the second correlator 320 may comprise a first input for inputting the received data signal $X_n$ and a second input for inputting the second training sequence. The second input may be connected with a second training sequence register 350 for storing a set of second training sequences.

The comparator 330 may further be configured to determine which one of the first and second correlation maxima is greater in value than the other one and to output a respective information signal. The information signal may, for example, have the form of a control flag which may be a symbol "1" if the first correlation maximum is greater than the second correlation maximum and which may be a symbol "0" if the second correlation maximum is greater than the first correlation maximum. The comparator 330 may comprise an output for outputting the information signal.

The comparator 330 may further comprise a further output for outputting a further information signal. The further information signal may have the form of a further control flag which may have the symbol value "1" if the first correlation maximum is greater than the second correlation maximum, a symbol value "−1" if the second correlation maximum is greater than the first correlation maximum, and a symbol value "0" if the first correlation maximum is comparable to the second correlation maximum.

The processing unit 300 may further comprise a first burst synchronization unit (not shown) to perform a first burst synchronization on the basis of the first training sequence, and a second burst synchronization unit (not shown) to perform a second burst synchronization on the basis of the second training sequence. A more detailed embodiment thereof will be shown and explained further below.

The processing unit 300 of FIG. 3 may further comprise a first channel estimation unit (not shown) to perform a first channel estimation based on the first training sequence, and a second channel estimation unit (not shown) to perform a second channel estimation based on the second training sequence. This will be also shown and explained in a detailed embodiment further below.

Figure 4:
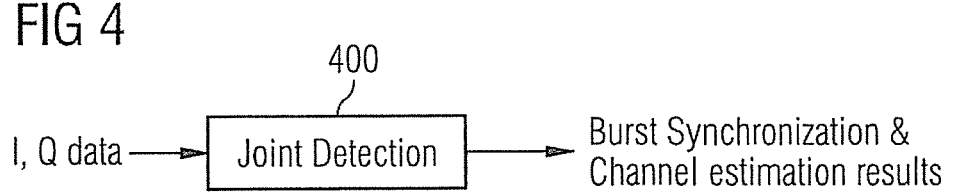
FIG. 4 shows a schematic block representation of a joint detection algorithm according to the disclosure.

FIG. 4 shows an example of a detection algorithm as it can be implemented in a VAMOS capable GSM system. As explained above, the power distribution to the I and Q sub-channels is such that one user sub-channel is on the rail of lower power according to the Sub-Channel Power Imbalance Ratio (SCPIR) configuration. The concept as shown in FIG. 4 is based on a joint detection algorithm, in which the downlink two sub-channels are mapped to the I and Q sub-channels of a QPSK type or adaptive QPSK modulation. The I and Q data are input into a joint detection block 400 in which both training sequences are utilized to yield burst synchronization and channel estimation results.

Figure 5:
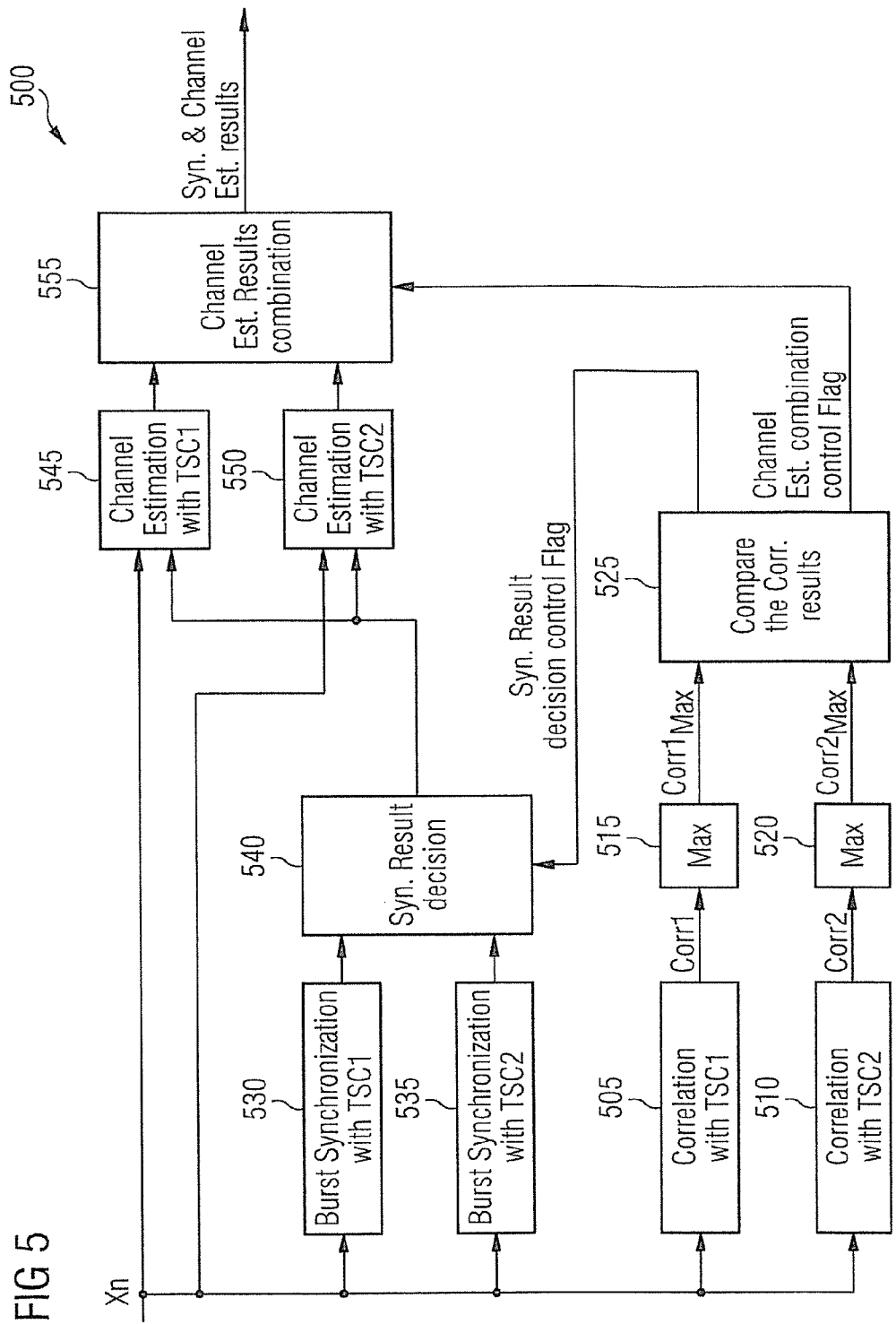
FIG. 5 shows a schematic block representation of a processing unit according to the disclosure.

FIG. 5 shows a schematic block representation of a processing unit according to the disclosure. The architecture of the processing unit, as shown in FIG. 5, shows in some more detail the joint detection architecture of FIG. 4. From this structure, the desired user can get robust synchronization channel estimation performance no matter whether he is allocated in a low power VAMOS rail or not.

The processing unit 500, as shown in FIG. 5, may comprise a first correlation unit 505 which may have an input for receiving a received data signal $X_n$. The processing unit 500 may further comprise a second correlation unit 510 which may have an input for receiving the received data signal $X_n$. The first correlation unit 505 may have an output which can be connected with an input of a first maximum detection unit 515, and the second correlation unit 510 may have an output which may be connected to an input of a second maximum detection unit 520. The first maximum detection unit 515 may comprise an output which may be connected with a first input of a comparator 525. The second maximum detection unit 520 may comprise an output which may be connected with a second input of the comparator 525.

The processing unit 500 of FIG. 5 may further comprise a first burst synchronization unit 530 which may have an input for receiving the received data signal $X_n$. The first burst synchronization unit 530 may be configured to perform a first burst synchronization with a first training sequence TSC1. For this purpose the first burst synchronization unit 530 may be connected with a first training sequence register (not shown) for storing first training sequences TSC1. The processing unit 500 may further comprise a second burst synchronization unit 534 which may have an input for receiving the received data signal $X_n$. The second burst synchronization unit 535 may be configured to perform a second burst synchronization with a second training sequence TSC2. The second burst synchronization unit 535 may be connected with a second training sequence register (not shown) for storing second training sequences TSC2.

The first burst synchronization unit 530 may comprise an output which may connected with a first input of a synchronization result decision unit 540. The second burst synchronization unit 535 may comprise an output which may be connected with a second input of the synchronization result decision unit 540. The synchronization result decision unit 540 may be configured to make a decision about which one of the results of the first and second bursts synchronization units 530 and 535 shall be selected for further processing the received data signal $X_n$. For this purpose the synchronization result decision unit 540 may comprise a third input which may be connected with a first output of the comparator 525 for transmitting a synchronization result decision control flag.

The processing unit 500 may further comprise a first channel estimation unit 545 which may comprise a first input for receiving the received data signal $X_n$ and a second input which may be connected with the output of the synchronization result decision unit 540. The first channel estimation unit 545 may be configured to perform a first channel estimation by use of the first training sequence TSC1. For this purpose the first channel estimation unit may be connected with the first training sequence register (not shown).

The processing unit 500 may further comprise a second channel estimation unit 550 which may comprise a first input for receiving the received data signal $X_n$ and a second input which may be connected with the output of the synchronization result decision unit 540. The second channel estimation unit 550 may be configured to perform a second channel estimation by use of the second training sequence TSC2. For this purpose the second channel estimation unit 550 may be connected with the second training sequence register (not shown).

The first channel estimation unit 545 may comprise an output which may be connected with a first input of a channel estimation results combination unit 555. The second channel estimation unit 550 may comprise an output which may be connected with a second input of the channel estimation results combination unit 555. The channel estimation results combination unit 555 may comprise a third input which may be connected with a second output of the comparator 525 for transmitting a channel estimation combination control flag. The channel estimation results combination unit 555 may be configured to select anyone of the channel estimation results of one of the first and second channel estimation units 545 and 550 for delivering it to an output for outputting both the burst synchronization and channel estimation results.

The operation of the processing unit 500 will be explained in further detail as follows. The received signal $X_n$ may be correlated with both first and second training sequences TSC1 and TSC2 in parallel, which can be implemented such that both correlations are carried out at one and the same time. The first training sequence TSC1 may refer to the training sequence of the desired user, and the second training sequence TSC2 may refer to the training sequence of the co-user. The correlation results may be fed into the first and second maximum detection units 515 and 520 to select a maximum correlation result. The two maximum correlation results from the two maximum detection units 515 and 520 may be compared in the comparator 525 in order to generate two flags, namely a synchronization result decision control flag and a channel estimation combination flag. The synchronization result decision control flag may be fed into the synchronization result decision unit 540 in order to select a synchronization result, i.e. to select one of the burst synchronization results of the first and second burst synchronization units 530 and 535. The channel estimation combination flag may be fed into the channel estimation results combination unit 555 to select one of the channel estimation results of the first and second channel estimation units 545 and 550. The first and second maximum detection units 515 and 520 may work by just selecting one maximum value out of a set of values supplied to them. However, the first and second maximum detection units 515 and 520 may also work by selecting the n biggest values from a set of values and then add them together. A more detailed example will be shown below in connection with FIG. 7.

Thus, in the detection algorithm the receiver will use the correlation results between the received signal and both training sequences to control the burst synchronization and channel estimation results combination. The synchronization and channel estimation results are generated by both training sequences from the VAMOS desired user and the co-user. Therefore one can say that the burst synchronization and channel estimation results will be improved due to the diversity brought by the two training sequences.

Figure 6:
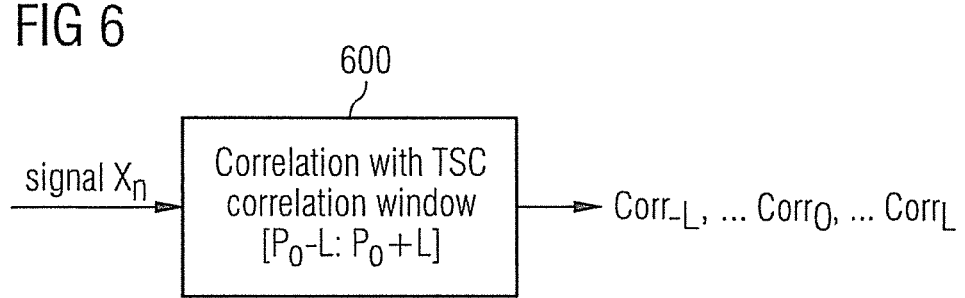
FIG. 6 shows a schematic block representation of a correlator according to the disclosure.

FIG. 6 shows a schematic block representation for illustrating the correlation procedure. The received signal $X_n$ may be input to an input of a correlation block 600. The received signal $X_n$ could be over-sampled or symbol rate sampled. For simplicity, one may suppose that the received signal $X_n$ is sampled at symbol rate. The correlation window size for searching the maximum correlation value equals to 2L+1, where L is a parameter used to control the window size and $P_0$ is the start position of the training sequence. If $X_n$ is over-sampled, this correlation operation can also be done without down-sampling, in this case the correlation result would be more accurate.

The synchronization result decision control flag generated by comparison correlator block could be presented in formula (1):

$$Syn.\ ResultDecisionControlFlag = \begin{cases} 1 & Corr1 > Corr2 \\ 0 & Corr1 < Corr2 \end{cases} \quad (1)$$

In formula (1), Corr1 indicates the correlation result of received signal and TSC1, Corr2 indicates the correlation result of received signal and TSC2.

And the synchronization result of TSC1 and TSC2 will be select according to the rule shown in formula (2):

$$Syn.\ Result = \qquad (2)$$
$$\begin{cases} Syn.\ Result\ from\ TSC1 & Syn.\ ResultDecisionControlFlag = 1 \\ Syn.\ Result\ from\ TSC2 & Syn.\ ResultDecisionControlFlag = 0 \end{cases}$$

The channel estimation combination flag generated by comparison correlation block could be presented in formula (3):

$$ChannelEst.Combination\ Flag = \begin{cases} 1 & Corr1 >> Corr2 \\ 0 & Corr1\ is\ comparable\ to\ Corr2 \\ -1 & Corr1 << Corr2 \end{cases} \quad (3)$$

In channel estimation results combination block, the channel estimation results could be combined as the formula (4):

$$ChannelEst.\ Result = \begin{cases} ChannelEst.Result_{TSC1} & ChannelEst.CombinationFlag = 1 \\ ChannelEst.Result_{TSC1} + ChannelEst.Result_{TSC2} & ChannelEst.CombinationFlag = 0 \\ ChannelEst.Result_{TSC2} & ChannelEst.CombinationFlag = -1 \end{cases} \quad (4)$$

wherein the sum of the channel estimation results in the middle line means any sort of average between the two channel estimation results or any sort of combination of the two channel estimation results.

Figure 7:
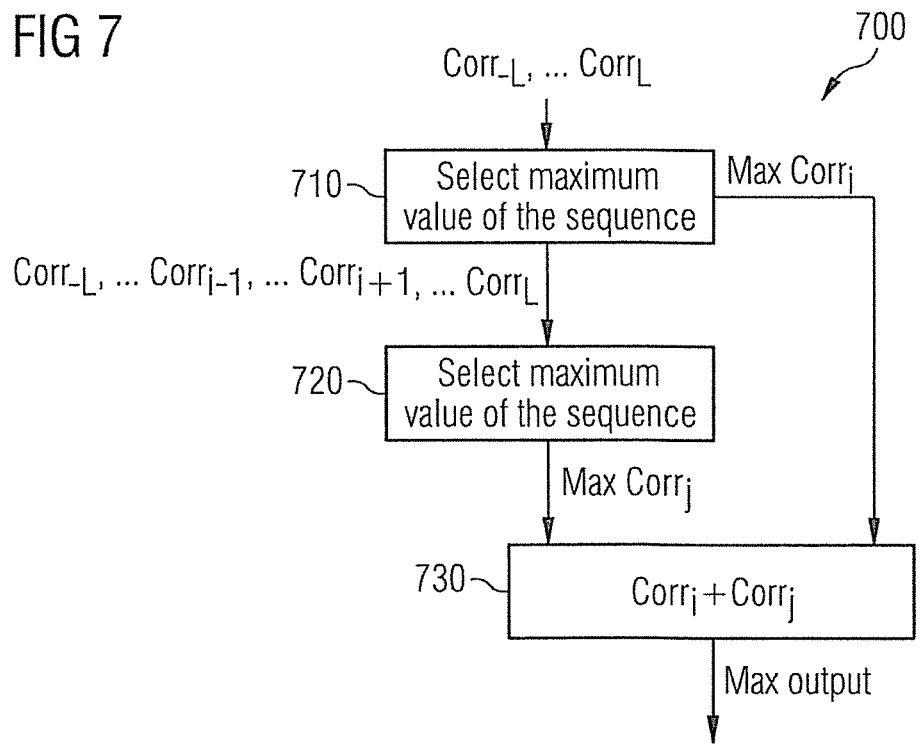
FIG. 7 shows a flow diagram of a method for determining a correlation maximum according to the disclosure.

FIG. 7 shows a block representation for illustrating the processing in each one of the maximum detection units 515 and 520. The method 700 comprises a first maximization block 710, wherein a maximum value is selected from the sequence $Corr_{-L}, \ldots, Corr_L$. A first output of the block 710 is connected with a second maximization block 720 in which a maximum value is selected from the sequence $Corr_{-L}, Corr_{i-1}, Corr_{i+1}, \ldots, Corr_L$. An output of block 720 is connected with a first input of an adder block 730 and a second output of block 710 is connected with a second input of the adder block 730. In the adder block 730 a sum $Corr_i + Corr_j$ is calculated. In block 710 a first maximum value may be determined from the set of values supplied thereto. The remaining set (without the first maximum value) is supplied to block 720 and a second maximum value may be determined from the set of values of the remaining set. Hence the method 700 works in fact by selecting the n biggest values from a set of values and then adding them together wherein n=2 in the Example of FIG. 7.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

What is claimed is:

1. A method for processing a received data signal, the method comprising:
receiving a data signal by using a Voice services over Adaptive Multi-user channels on One Slot (VAMOS) receiver, the data signal comprising two training sequences;
performing a first evaluation of the data signal based on a first training sequence of the two training sequences;
performing a second evaluation of the data signal based on a second training sequence of the two training sequences; and
processing the data signal based on a result of the first and second evaluations;
wherein processing the data signal comprises burst synchronization.

2. The method according to claim 1, further comprising:
performing a first evaluation comprising performing a first correlation between the data signal and the first training sequence and determining a first correlation maximum thereof;
performing a second evaluation comprising performing a second correlation between the data signal and the second training sequence and determining a second correlation maximum thereof; and
comparing the first correlation maximum with the second correlation maximum.

3. The method according to claim 1, further comprising:
performing a first burst synchronization based on the first training sequence and performing a second burst synchronization based on the second training sequence; and
utilizing the result of one of the first and second burst synchronizations or an average thereof based on a result of the first and second evaluations.

4. The method according to claim 3, further comprising:
utilizing the result of the first burst synchronization if the first correlation maximum is greater than the second correlation maximum, and
utilizing the result of the second burst synchronization if the second correlation maximum is greater than the first correlation maximum.

5. The method according to claim 1, further comprising:
performing a first channel estimation based on the first training sequence and at the same time performing a second channel estimation based on the second training sequence; and
utilizing the result of one of the first and second channel estimations or an average thereof dependent on a result of the first and second evaluations.

6. The method according to claim 5, further comprising:
utilizing the result of the first channel estimation if the first correlation maximum is greater than the second correlation maximum, and
utilizing the result of the second channel estimation if the second correlation maximum is greater than the first correlation maximum.

7. The method according to claim 6, further comprising:
utilizing an average of the results of the first and second channel estimations if the first and second correlation maxima are equal or differ from each other by less than a pre-defined factor.

8. The method according to claim 1, further comprising:
receiving as an information signal a rotational angle of the data signal.

9. The method according to claim 8, further comprising:
de-rotating the received signal based on the rotational angle.

10. A method for processing a received data signal, the method comprising:
receiving a data signal, the data signal comprising two training sequences;
performing a first correlation between the data signal and a first training sequence of the two training sequences and determining a first correlation maximum thereof;
performing a second correlation between the data signal and a second training sequence of the two training sequences and determining a second correlation maximum thereof; and
processing the data signal based on a comparison between the first and second correlation maxima,
wherein processing the data signal comprises one or more of burst synchronization and channel estimation;
performing a first channel estimation based on the first training sequence and performing a second channel estimation based on the second training sequence; and
utilizing the result of the first channel estimation if the first correlation maximum is greater than the second correlation maximum;
utilizing the result of the second channel estimation if the second correlation maximum is greater than the first correlation maximum; and
utilizing an average of the results of the first and second channel estimations if the first and second correlation maxima are equal or differ from each other by less than a pre-defined factor.

11. The method according to claim 10, further comprising:
performing a first burst synchronization based on the first training sequence and performing a second burst synchronization based on the second training sequence; and
utilizing the result of one of the first and second burst synchronizations or an average thereof based on a result of the first and second correlation maxima.

12. The method according to claim 11, further comprising:
utilizing the result of the first burst synchronization if the first correlation maximum is greater than the second correlation maximum, and
utilizing the result of the second burst synchronization if the second correlation maximum is greater than the first correlation maximum.

13. The method according to claim 10, wherein receiving the digital signal comprises receiving the data signal by using a Voice services over Adaptive Multi-user channels on One Slot, VAMOS, receiver.

14. The method according to claim 10, further comprising:
receiving as an information signal a rotational angle of the data signal.

15. The method according to claim 14, further comprising:
de-rotating the received signal based on the rotational angle.

16. A processing unit, the processing unit comprising:
a first correlator configured to perform a first correlation between a received data signal and a first training sequence and determine a first correlation maximum thereof;
a second correlator configured to perform a second correlation between the received data signal and a second training sequence and determine a second correlation maximum thereof;

a comparator configured to compare the first and second correlation maxima with each other and output a respective information signal in response thereto;

a first burst synchronization unit configured to perform a first burst synchronization based on the first training sequence;

a second burst synchronization unit configured to perform a second burst synchronization based on the second training sequence; and a burst synchronization decision unit comprising a first input connected with an output of the first burst synchronization unit, a second input connected with an output of the second burst synchronization unit, and a third input connected with an output of the comparator.

17. The processing unit according to claim 16, further comprising:

a first channel estimation unit configured to perform a first channel estimation based on the first training sequence; and a second channel estimation unit configured to perform a second channel estimation based on the second training sequence.

18. The processing unit according to claim 17, further comprising:

a channel estimation decision unit comprising a first input connected with an output of the first channel estimation unit, a second input connected with an output of the second channel estimation unit, and a third input connected with an output of the comparator.

* * * * *